(12) United States Patent
Li

(10) Patent No.: US 11,673,596 B2
(45) Date of Patent: Jun. 13, 2023

(54) SNAPPING STRUCTURE AND BABY CARRIER USING THE SAME

(71) Applicant: WONDERLAND SWITZERLAND AG, Steinhausen (CH)

(72) Inventor: Fangming Li, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/534,788

(22) Filed: Nov. 24, 2021

(65) Prior Publication Data

US 2022/0161838 A1 May 26, 2022

(30) Foreign Application Priority Data

Nov. 26, 2020 (CN) .......................... 202011344502.8

(51) Int. Cl.
*B62B 9/12* (2006.01)
*B62B 9/28* (2006.01)
*B62B 9/18* (2006.01)
*B62B 9/26* (2006.01)

(52) U.S. Cl.
CPC ............... *B62B 9/12* (2013.01); *B62B 9/18* (2013.01); *B62B 9/28* (2013.01); *B62B 9/26* (2013.01)

(58) Field of Classification Search
CPC .... B62B 9/12; B62B 9/18; B62B 9/28; B62B 9/26; B62B 9/102; B62B 7/142; B62B 7/14; A47D 15/00; A47D 1/006; B60R 22/26; B60N 2/28; B60N 2/2848
See application file for complete search history.

(56) References Cited

U.S. PATENT DOCUMENTS

| 9,840,168 | B2* | 12/2017 | Yi ........................... B62B 7/142 |
| 9,884,640 | B2* | 2/2018 | Li ............................... B62B 7/08 |
| 10,899,377 | B2* | 1/2021 | Eggert-Crowe .......... B62B 9/28 |
| 11,203,371 | B2* | 12/2021 | Zhong ..................... B62B 7/068 |
| 2014/0061404 | A1* | 3/2014 | Xiao ....................... F16M 11/00 248/154 |
| 2018/0029625 | A1* | 2/2018 | Ruggiero ............. B60N 2/2845 |

(Continued)

FOREIGN PATENT DOCUMENTS

| CN | 102616266 A | 8/2012 |
| CN | 104228921 A | 12/2014 |

(Continued)

OTHER PUBLICATIONS

Office Action dated Nov. 25, 2022 from corresponding application No. TW 11121164540.

(Continued)

*Primary Examiner* — James A Shriver, II
*Assistant Examiner* — Ian Bryce Shelton
(74) *Attorney, Agent, or Firm* — Hauptman Ham, LLP

(57) ABSTRACT

A snapping structure is provided, which is configured to detachably mount a body to a support frame. The snapping structure includes a locking member movably disposed on the body and a positioning member disposed on the support frame and mated with the locking member. The locking member is movable to be locked to the positioning member, so as to mount the body to the support frame, or the locking member is movable to be unlocked from the positioning member, so as to separate the body from the support frame.

20 Claims, 7 Drawing Sheets

(56) References Cited

U.S. PATENT DOCUMENTS

| | | | | |
|---|---|---|---|---|
| 2018/0312188 A1* | 11/2018 | Haut | ......................... | B62B 7/08 |
| 2020/0010105 A1* | 1/2020 | Cheng | ....................... | B62B 7/06 |
| 2021/0078462 A1* | 3/2021 | Cheng | ..................... | B62B 7/145 |

FOREIGN PATENT DOCUMENTS

| | | | | |
|---|---|---|---|---|
| CN | 107662633 | | 2/2018 | |
| CN | 113119821 A | | 7/2021 | |
| GB | 2468767 A | * | 9/2010 | ........... B60N 2/2821 |
| WO | WO-2019009190 A1 | * | 1/2019 | |
| WO | 2021137164 A1 | | 7/2021 | |

OTHER PUBLICATIONS

Office Action dated Nov. 25, 2022 from corresponding application No. TW 110143314.

* cited by examiner

SNAPPING STRUCTURE AND BABY CARRIER USING THE SAME

CROSS REFERENCE TO RELATED APPLICATIONS

This application claims priority to the Chinese Patent Application No. 2020113445028, filed on Nov. 26, 2020 and entitled "SNAPPING STRUCTURE", the entire content of which is incorporated herein in its entirety.

TECHNICAL FIELD

The present disclosure relates to the technical field of baby products, and more particularly relates to a snapping structure and a baby carrier using the same.

BACKGROUND

Sleep box may be mounted to a baby carriage or an automobile seat to provide a comfortable and safe sleep environment for a baby, and help a caregiver to take care of the baby. When the sleep box is required to be mounted on a carrier such as a vehicle frame or a bed frame, it always requires a mating and fixing structure. The conventional mating structure occupies a relatively large space, is complex, and is inconvenient to operate, causing inconvenience to a caregiver.

SUMMARY

According to some embodiments, a snapping structure and a baby carrier using same are provided.

A snapping structure is adapted to detachably mount a body to a support frame. The snapping structure includes a locking member movably disposed on the body and a positioning member disposed on the support frame and mated with the locking member. The locking member moves to be locked to the positioning member, so as to mount the body to the support frame, or the locking member moves to be unlocked from the positioning member, so as to separate the body from the support frame.

A baby carrier includes a body, a support frame, and the above snapping structure.

The above description is merely an overview of the technical solutions of this application. In order to understand the technical means of this application more clearly, detailed description is provided below in combination with preferred embodiments of this application and the drawings.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings according to these accompanying drawings without creative efforts.

DETAILED DESCRIPTION OF THE EMBODIMENTS

For ease of understanding this application, this application is described more comprehensively below with reference to the accompanying drawings. Exemplary embodiments of this application are provided in the accompanying drawings. However, this application may be implemented in many different forms, and is not limited to the embodiments described in this specification. On the contrary, an objective of providing the embodiments is to understand the content disclosed in the present invention more comprehensively.

Unless otherwise defined, meanings of all technical and scientific terms used in this specification are the same as those usually understood by a person skilled in the art to which this application belongs. In this application, terms used in this specification of this application are merely intended to describe objectives of the specific embodiments, but are not intended to limit this application. The term "and/or" used in this specification includes any and all combinations of one or more related listed items.

Figure 1:
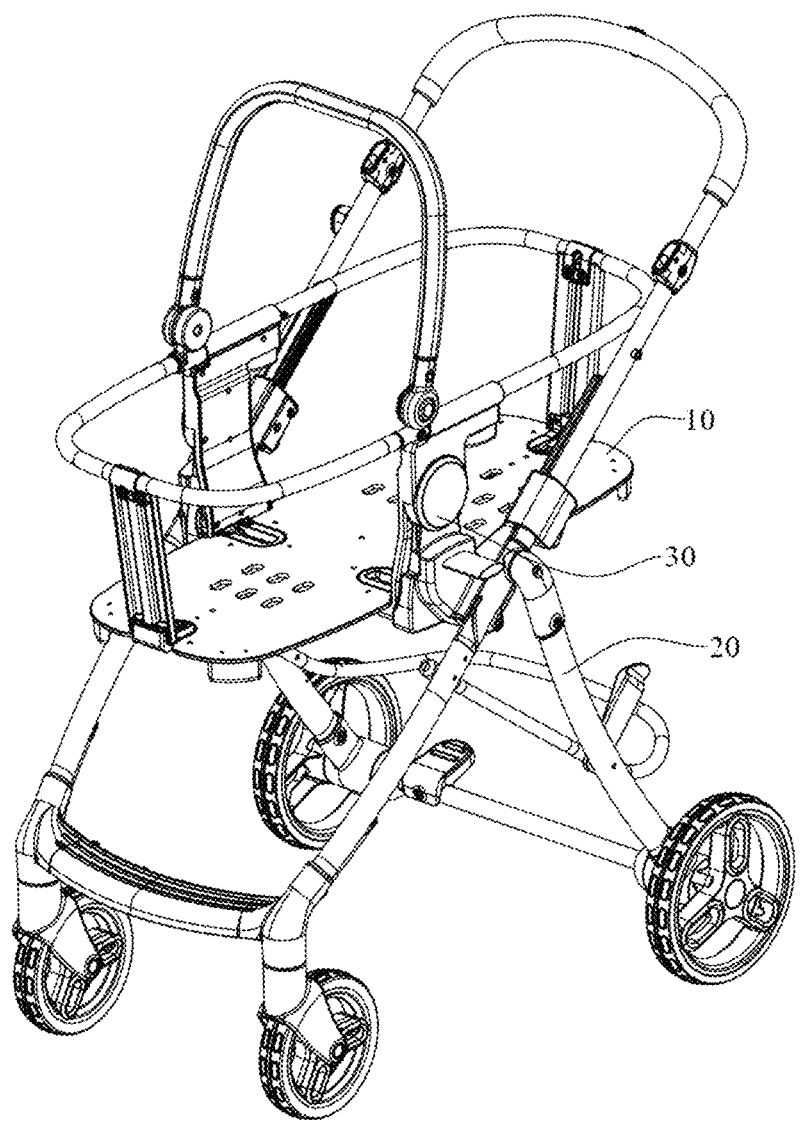
FIG. 1 is a perspective view of a baby carrier according to an embodiment.
Figure 2:
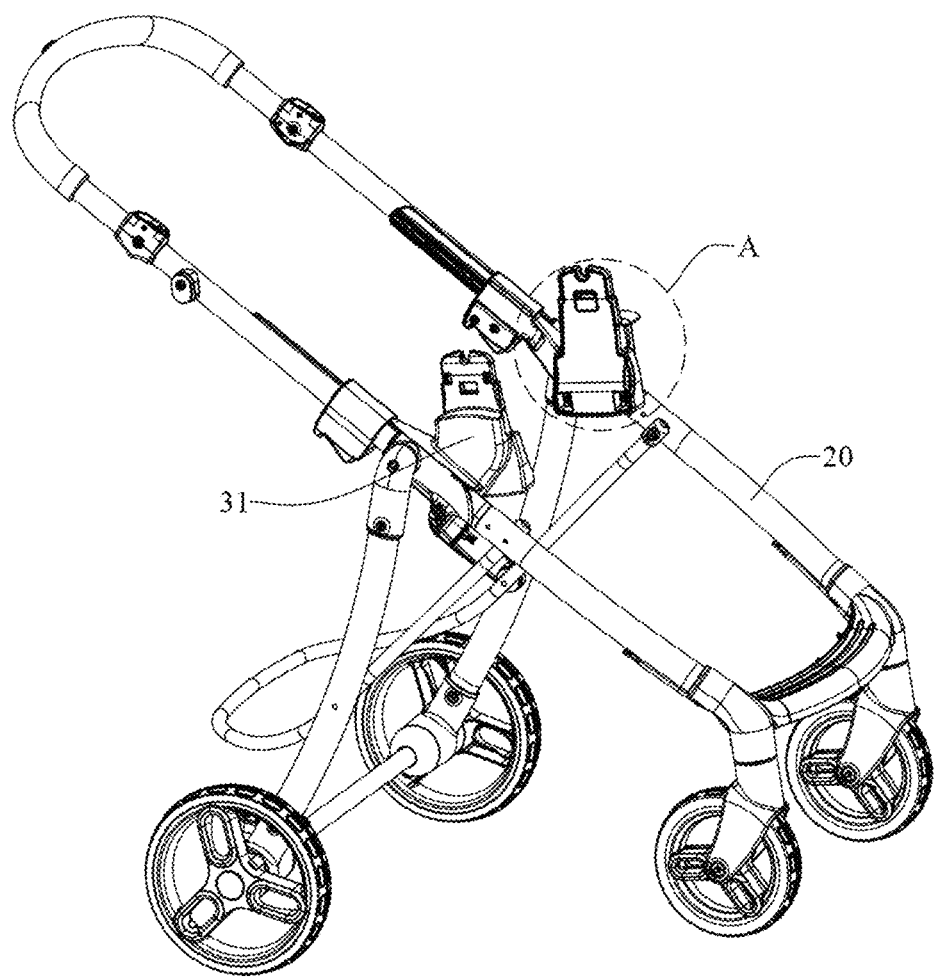
FIG. 2 is a perspective view of a support frame in FIG. 1.
Figure 3:
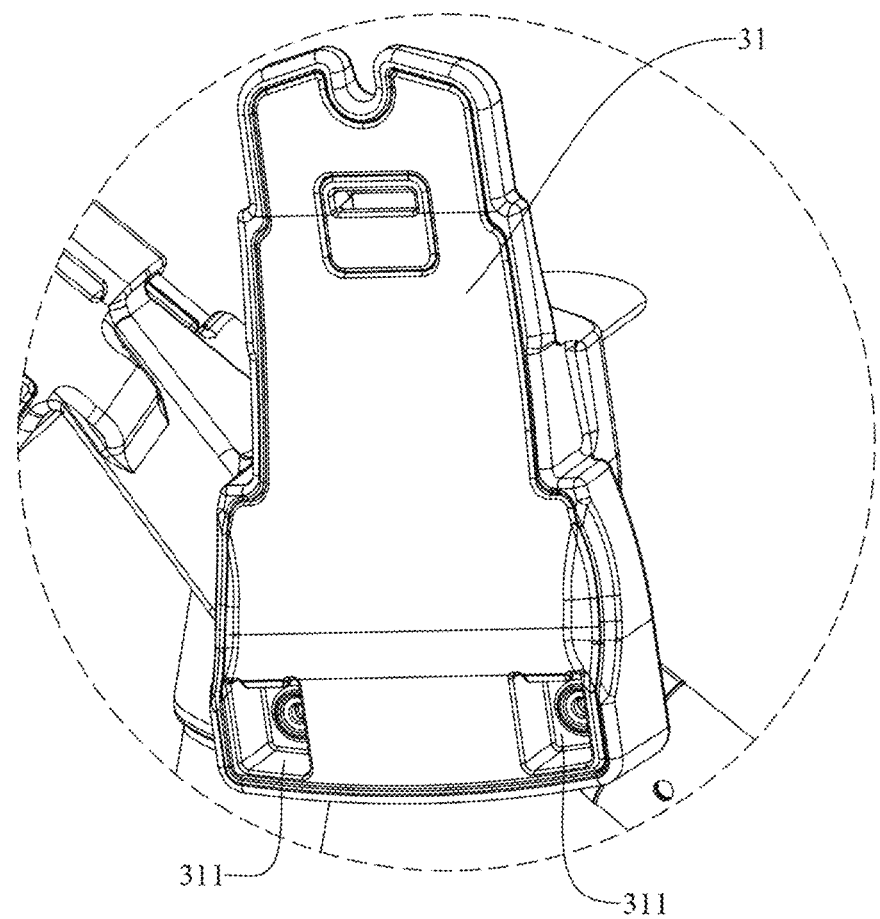
FIG. 3 is an enlarged view of portion A in FIG. 2.
Figure 4:
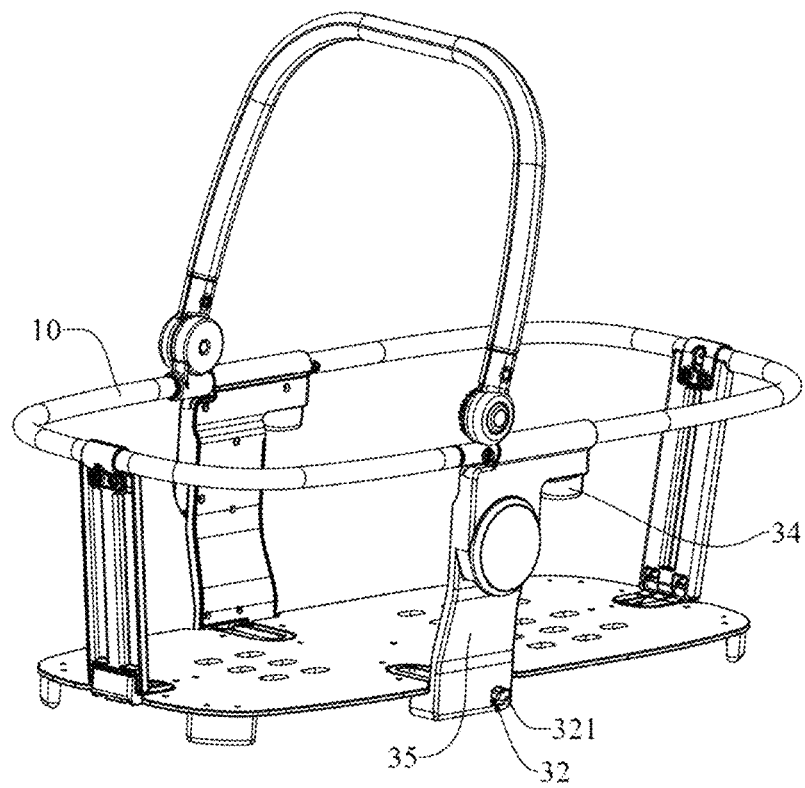
FIG. 4 is a perspective view of a body in FIG. 1.

Referring to FIG. 1 and FIG. 2, according to an embodiment, a baby carrier 100 is provided. The baby carrier includes a body 10, a support frame 20, and a snapping structure 30. The snapping structure 30 is configured to detachably mount the body 10 to the support frame 20. The body 10 may be a sleep box, a baby seat, or the like. The support frame 20 may be a baby carriage frame, an automobile safety seat frame, a baby crib frame, or the like. The sleep box or the baby seat may be detachably mounted to a baby carrier 100 such as a baby carriage, an automobile safety seat, or a baby crib by using the snapping structure 30.

Specifically, the snapping structure 30 includes a locking member 32 movably disposed on the body 10 and a positioning member 31 disposed on the support frame 20 and mated with the locking member 32. The locking member 32 can move to be locked to the positioning member 31, so as to mount the body 10 to the support frame 20. Alternatively, the locking member 32 can move to be unlocked from the positioning member 31, so as to separate the body 10 from the support frame 20. It should to be understood that, by moving the locking member 32 to be mated with the positioning member 31, the body 10 can be mounted to the support frame 20. Alternatively, by moving the locking member 32 to be disengaged and unlocked from positioning member 31, the body 10 can be detached from the support frame 20. The above snapping structure 30 is simple and is convenient to operate.

According to the above embodiment, the snapping structure 30 can be used to detachably mount the body 10 such as a sleep box or a baby seat to the support frame 20 such as a baby carriage frame, an automobile safety seat frame, or a baby crib frame. The locking member 32 is movably disposed on the body 10, and the positioning member 31 mated with the locking member 32 is disposed on the support frame 20. By moving the locking member 32 to be locked to the positioning member 31, the body 10 can be mounted to the support frame 20. By moving the locking member 32 to be unlocked from the positioning member 31, the body 10 can be separated from the support frame 20. According to the above snapping structure 30, the locking member 32 on the body 10 is mated with the positioning member 31 on the support frame 20, such that the body 10 can be detachably mounted to the support frame 20. The structure is simple, is convenient to operate, and is applicable for wide use.

Referring to FIG. 1 to FIG. 4, in some embodiments, the locking member 32 is telescopically movable relative to the positioning member 31, so as to be locked to or unlocked from the positioning member 31, i.e., the locking member 32 is telescopically movable to be mated with the positioning member 31. When the locking member 32 stretches, the locking member 32 is locked to and mated with the positioning member 31. When the locking member 32 retracts, the locking member 32 is disengaged and unlocked from the positioning member 31. Specifically, the locking member 32 includes a locking portion 321 that may protrude from a housing 35 of the snapping structure 30. The positioning member 31 includes at least one positioning portion 311. The locking member 32 is telescopically moved to cause the locking portion 321 to protrude from the housing 35, so as to be mated with the positioning portion 311 on the positioning member 31, thereby mounting the body 10 to the support frame 20. Alternatively, the locking member 32 moves telescopically to separate the locking portion 321 from the positioning portion 311, so as to separate the body 10 from the support frame 20.

Referring to FIG. 1 to FIG. 4, in this embodiment, the positioning member 31 includes two positioning portions 311. Each positioning portion 311 may be a through hole or a groove that can be mated with the locking portion 321. The through hole or the groove has an opening facing the locking portion 321, so as to be mated with the locking portion 321. Specifically, when the locking portion 321 is mated with one of the two positioning portions 311, the sleep box or the seat is placed forward on the support frame 20. When the locking portion 321 is mated with the other one of the positioning portions 311, the sleep box or the seat is placed backward on the support frame 20. A position of the body 10 relative to the support frame 20 may be adjusted by locking the locking portion 321 to different positioning portions 311. In other words, the sleep box or the seat may be placed forward or backward on the support frame 20 according to an actual use requirement, to satisfy more use requirements of babies and provide more practicability. In other embodiments, a plurality of positioning portions 311 may also be provided on the positioning member 31, and the locking portion 321 is selectively locked to the different positioning portions 311 to adjust the mounting positions of the sleep box or the seat relative to the support frame 20, thereby satisfying more actual use requirements.

Referring to FIG. 4 to FIG. 7, in some embodiments, the body 10 is provided with a driving assembly configured to drive the locking member 32. The driving assembly is located in the housing 35 and is connected to the locking member 32. The driving assembly includes a driving member 33 mated with the locking member 32. The driving member 33 is movably disposed on the body 10. The driving member 33 moves to drive the locking member 32 to stretch and retract, such that the locking member 32 is locked to and mated with the positioning member 31 or the locking member 32 is separated from the positioning member 31. Specifically, a driving portion is disposed on the driving member 33, and a transmission portion 322 mated with the driving portion is disposed on the locking member 32. The driving member 33 moves to drive the transmission portion 322 to move, so as to lock the locking member 32 to the positioning member 31 or unlock the locking member from the positioning member.

Figure 5:
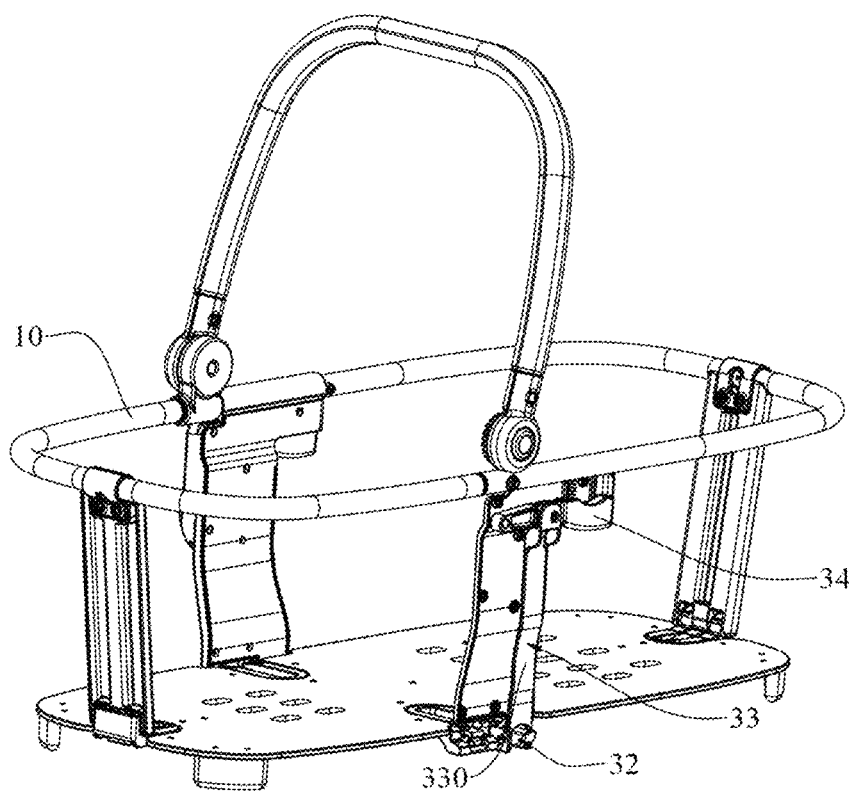
FIG. 5 is a perspective view of a snapping structure in FIG. 4 with a housing removed.
Figure 6:
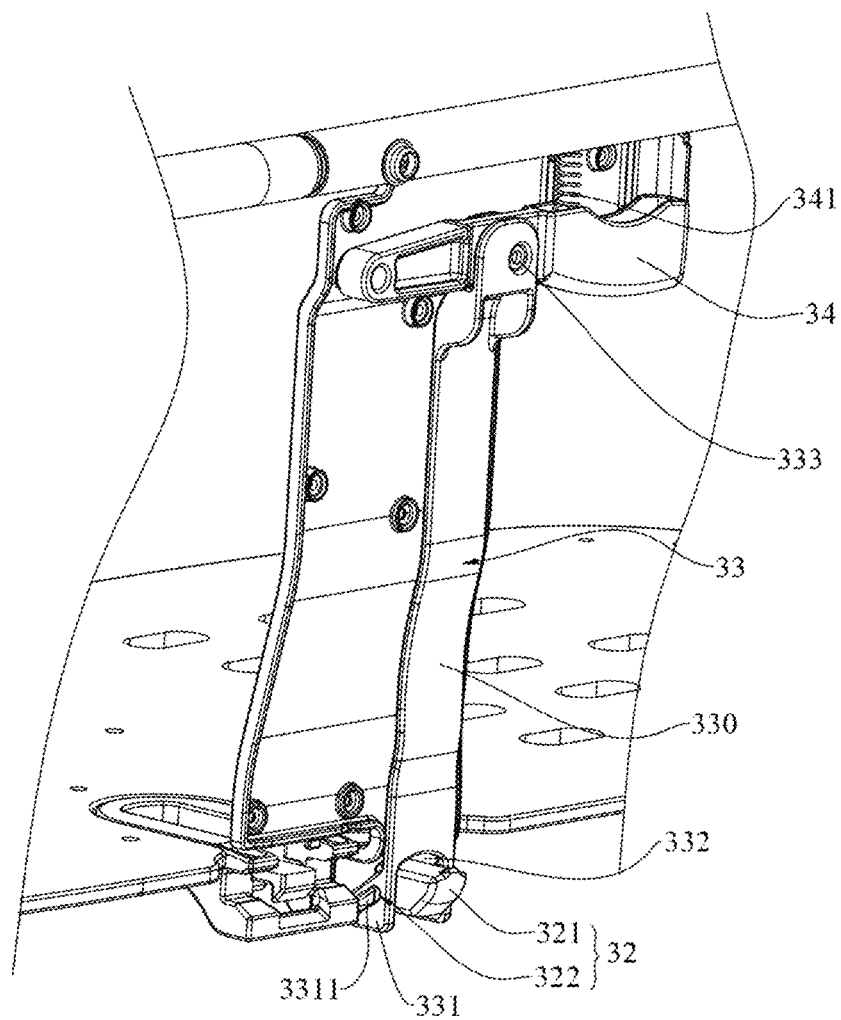
FIG. 6 is a partial enlarged view of FIG. 5.
Figure 7:
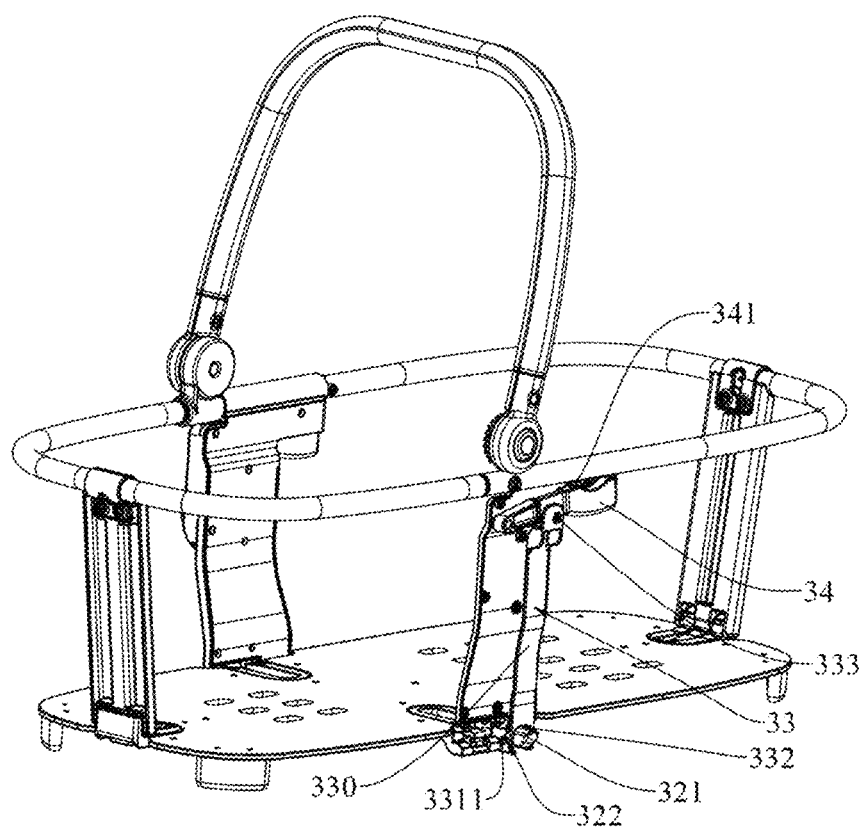
FIG. 7 is a perspective view of an operating member in FIG. 5 in another state.

Referring to FIG. 5 to FIG. 7, in some embodiments, two driving plates 331 are provided on both sides of the driving member 33 extending in a direction in which the locking member 32 stretches and retracts. The driving plate 331 is connected to a connecting plate 330 and is substantially perpendicular to the connecting plate 330. The driving portion is disposed on the driving plate 331. In the illustrated embodiment, the driving portion may be a driving chute 3311, which is obliquely provided on the driving plate 331 by a specific angle. Therefore, when the transmission portion 322 is mated with the driving chute 3311, the locking portion 321 can move telescopically relative to the connecting plate 330. The driving plate 331 has a triangular shape corresponding to the driving chute 3311, such that the structure layout is more compact and proper. An end surface of the locking portion 321 that is mated with the positioning portion 311 may be inclined by a preset angle, such that the locking portion 321 can move telescopically more effectively under the action of the transmission portion 322, enabling the locking portion 321 to be mated with the positioning portion 311 or disengaged from the positioning portion 311 more effectively. The preset angle is a proper angle at which the locking portion 321 can be mated with the positioning portion 311. In addition, a transmission portion 322 mated with the driving chute 3311 is provided on the locking member 32. The transmission portion 322 protrudes from both sides of the locking member 32 and is slidably located in the driving chute 3311. When the driving member 33 moves, the driving plate 331 is driven to move, such that the transmission portion 322 in the driving chute 3311 slides along the driving chute 3311. Since the driving chute 3311 is inclinedly arranged, as the transmission portion 322 slides in the driving chute 3311, the driving chute 3311 will squeeze the transmission portion 322, such that the transmission portion 322 drives the locking portion 321 to move telescopically. Specifically, when the driving member 33 moves up and down in a vertical direction, and the driving chute 3311 can restrict the movement of the transmission portion 322 in the vertical direction, Therefore, the transmission portion 322 drives the locking portion 321 to move in a horizontal direction, so as to achieve the stretching and retracting of the locking portion 321. In other words, the movement of the driving member 33 in the vertical direction is converted to the movement of the locking portion 321 in the horizontal direction by means of the mating between the driving chute 3311 and the transmission portion 322. The above snapping structure 30 is simple and useful.

Referring to FIG. 3 to FIG. 7, in some embodiments, a notch 332 configured to accommodate the locking portion 321 is provided on one end of the driving member 33 that is mated with the locking member 32, and the locking portion 321 can stretch and retract through the notch 332. When the driving member 33 moves up and down, the locking portion 321 moves telescopically through the notch 332 by the transmission portion 322 mated with the driving chute 3311, and the locking portion 321 may extend through the notch 332 and protrude from the housing 35 to be mated with the positioning portion 311. The driving plate 331 is located on one side or on both sides of the notch 332 and is disposed on the connecting plate 330 along a first direction. The first direction is a direction substantially perpendicular to the connecting plate 330. It should be understood that, since the driving plate 331 is disposed on one side or on the two sides of the notch 332, the driving chute 3311 mated with the transmission portion 322 may be disposed on either side of the notch 332, or two driving chutes 3311 mated with the transmission portion 322 are disposed on both sides of the notch 332, as long as the driving member 33 can drive the transmission portion 322 to slide in the driving portion and drive the locking portion 321 to stretch and retract through the notch 332.

Referring to FIG. 1 and FIG. 4 to FIG. 7, in some embodiments, the driving assembly further includes an operating member 34. The operating member 34 is connected to an end of the driving member 33 away from the locking member 32 by a connecting portion 333. A part of the operating member 34 protrudes from the housing 35 of the snapping structure 30 for a user to operate the operating member 34. By operating the part of the operating member 34 that protrudes from the body 10, the driving member 33 drives the locking member 32 to move telescopically. Specifically, the operating member 34 is slidably disposed on the body 10, and the operating member 34 is operated to slide along the body 10 and drive the driving member 33 to move. The operating member 34 can slide in the vertical direction along the body 10. The driving member 33 is connected to the operating member 34 by the connecting portion 333. By operating the operating member 34, it can drive the driving member 33 to slide in the vertical direction, such that the driving chute 3311 acts on the transmission portion 322, and the transmission portion 322 drives the locking portion 321 to move telescopically in the horizontal direction. The operating member 34 can help drive the driving member 33 to move, thus facilitating use. In the illustrated embodiment, a reset member 341 enabling a constant reset tendency of the operating member 34 is disposed on the operating member 34. After the operation of the operating member 34 stops, the reset member 341 can enable the operating member 34 to be reset. In this embodiment, the reset member 341 is a spring. In other embodiments, the reset member 341 may be an elastic structure that can be compressed and restored.

Referring to FIG. 1 to FIG. 7 again, the aforementioned snapping structure 30 is configured to detachably mount the body 10 such as a sleep box or a baby seat to the support frame 20 such as a baby carriage frame, an automobile safety seat frame, or a baby crib frame. The movable locking member 32 is disposed on the body 10, and the positioning member 31 mated with the locking member 32 is disposed on the support frame 20. The locking member 32 is connected to the driving member 33 that can move up and down, and the movement of the driving member 33 may be controlled by the operating member 34. The operating member 34 partially protrudes from the body 10, thus facilitating operation by the user. The driving member 33 drives the locking member 32, such that the movement of the driving member 33 in the vertical direction is converted to the movement of the locking member 32 in the horizontal direction. By means of the telescopic movement of the locking member 32 in the horizontal direction, the locking member 32 can be locked to the positioning member 31, such that the body 10 can be mounted to the support frame 20. By means of the telescopic movement of the locking member 32 in the horizontal direction, the locking member 32 may also be disengaged and unlocked from the positioning member 31, such that the body 10 can be separated from the support frame 20. The above snapping structure 30 is adapted for the detachable baby carrier 100. A sleep box or a baby seat may be detachably mounted to the body 10, such as a baby carriage, an automobile safety seat, or a baby crib by using the snapping structure 30. Therefore, the baby carrier 100 can have more combinations and a wider use prospect. In addition, the snapping structure 30 is convenient to operate, such that the body 10 mated with the support frame 20 can be replaced more conveniently and quickly. Moreover, by means of the mating between the locking member 32 on the body 10 and the different positioning members 31 on the support frame 20, the use state and the position of the body 10 on the support frame 20 can be adjusted. Therefore, the body 10 and the support frame 20 can be combined in such a way that more user demands are satisfied, providing more user-friendliness and comfort. The above snapping structure 30 is simple and is convenient to operate, and enables more use states for the baby carrier 100. The above snapping structure 30 is applicable to wide use.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A snapping structure adapted to detachably mount a body to a support frame, the snapping structure comprising:
a locking member movably disposed on the body; and
a positioning member disposed on the support frame and mated with the locking member,
wherein
the locking member is configured to move to be locked to the positioning member, so as to mount the body to the support frame, or the locking member is configured to move to be unlocked from the positioning member, so as to separate the body from the support frame,
the body is provided with a driving assembly configured to drive the locking member,
the driving assembly includes:
a driving member mated with the locking member, the driving member being configured to drive the locking member to be locked to the positioning member or drive the locking member to be disengaged from the positioning member, and
an operating member rotatably connected to an end of the driving member away from the locking member,
one end of the operating member is rotatably connected to a housing fixed to the body, and
the operating member is configured to rotate relative to the body to cause the driving member to drive the locking member to move telescopically.

2. The snapping structure according to claim 1, wherein the locking member is telescopic relative to the positioning member to be locked to or unlocked from the positioning member.

3. The snapping structure according to claim 1, wherein the locking member comprises a protruding locking portion,
the positioning member is provided with a positioning portion, the locking portion is configured to stretch to be mated with the positioning portion, so as to mount the body to the support frame, and the locking portion is configured to retract to be separated from the positioning portion, so as to separate the body from the support frame.

4. The snapping structure according to claim 3, wherein a plurality of different positioning portions are disposed on the positioning member, and the locking portion is selectively locked to the different positioning portions to adjust a position of the body relative to the support frame.

5. The snapping structure according to claim 3, wherein the driving member is provided with a driving portion, the locking member is provided with a transmission portion mated with the driving portion, and the driving member is configured to drive the transmission portion to move to lock the locking member to the positioning member or disengage the locking member from the positioning member.

6. The snapping structure according to claim 5, wherein the driving portion is a driving chute, and the transmission portion protrudes from the locking member and is slidably located in the driving chute.

7. The snapping structure according to claim 5, wherein an end of the driving member is provided with a notch configured to accommodate the locking portion, and the locking portion protrudes from the notch to be mated with a positioning portion of the positioning member.

8. The snapping structure according to claim 7, wherein one side or two sides of the notch is provided with a driving plate extending in a first direction, the driving portion is disposed on the driving plate, and the driving member is configured to move to drive the transmission portion to slide in the driving portion, to cause the locking member to move telescopically at the notch.

9. The snapping structure according to claim 1, wherein the operating member is provided with a reset member enabling the operating member to have a reset tendency.

10. The snapping structure according to claim 9, wherein the reset member is a spring.

11. The snapping structure according to claim 3, wherein an end surface of the locking portion that is mated with the positioning portion is inclined by a preset angle.

12. The snapping structure according to claim 1, wherein the body is a sleep box or a baby seat.

13. The snapping structure according to claim 1, wherein the support frame is a baby carriage frame, an automobile safety seat frame, or a baby crib frame.

14. A baby carrier, comprising the body, the support frame, and the snapping structure according to claim 1.

15. A body configured to be detachably mounted to a support frame, the body comprising:

a snapping structure configured to detachably mount the body to the support frame, the snapping structure comprising:

a locking member movably disposed on the body; and a positioning member on the support frame and mated with the locking member, wherein the locking member is moveable to be locked to the positioning member to mount the body to the support frame, or to be unlocked from the positioning member to separate the body from the support frame; and a driving assembly configured to drive the locking member, the driving assembly comprising a driving member mated with the locking member, the driving member configured to drive the locking member to be locked to the positioning member or to be disengaged from the positioning member, and an operating member rotatably connected to an end of the driving member away from the locking member, wherein one end of the operating member is rotatably connected to a housing fixed to the body, and the operating member is configured to rotate relative to the body to cause the driving member to drive the locking member to move telescopically.

16. The body according to claim 15, wherein the locking member is telescopic relative to the positioning member to be locked to or unlocked from the positioning member.

17. The body according to claim 15, wherein the locking member comprises a protruding locking portion, the positioning member is provided with a positioning portion, the locking portion is configured to stretch to be mated with the positioning portion, so as to mount the body to the support frame, and the locking portion is configured to retract to be separated from the positioning portion, so as to separate the body from the support frame.

18. The body according to claim 17, wherein a plurality of different positioning portions are disposed on the positioning member, and the locking portion is selectively locked to the different positioning portions to adjust a position of the body relative to the support frame.

19. The body according to claim 15, wherein the driving member is provided with a driving portion, the locking member is provided with a transmission portion mated with the driving portion, and the driving member is configured to drive the transmission portion to move to lock the locking member to the positioning member or disengage the locking member from the positioning member.

20. The body according to claim 19, wherein the driving portion is a driving chute, and the transmission portion protrudes from the locking member and is slidably located in the driving chute.

* * * * *